United States Patent
Zhang et al.

(10) Patent No.: US 11,019,462 B2
(45) Date of Patent: May 25, 2021

(54) USER EQUIPMENT, BASE STATION, AND RELATED METHODS

(71) Applicants: Sharp Kabushiki Kaisha, Sakai (JP); FG Innovation Company Limited, Tuen Mun (CN)

(72) Inventors: Chongming Zhang, Shanghai (CN); Shohei Yamada, Sakai (JP); Renmao Liu, Shanghai (CN)

(73) Assignees: SHARP KABUSHIKI KAISHA, Sakai (JP); FG Innovation Company Limited, New Territories (HK)

( * ) Notice: Subject to any disclaimer, the term of this patent is extended or adjusted under 35 U.S.C. 154(b) by 303 days.

(21) Appl. No.: 16/323,499

(22) PCT Filed: Aug. 8, 2017

(86) PCT No.: PCT/CN2017/096416
§ 371 (c)(1),
(2) Date: Feb. 5, 2019

(87) PCT Pub. No.: WO2018/028562
PCT Pub. Date: Feb. 15, 2018

(65) Prior Publication Data
US 2021/0099842 A1    Apr. 1, 2021

(30) Foreign Application Priority Data
Aug. 9, 2016   (CN) .......................... 201610647892.3

(51) Int. Cl.
*H04W 4/06* (2009.01)
*H04W 80/02* (2009.01)
*H04W 76/19* (2018.01)
*H04W 76/30* (2018.01)
*H04W 76/27* (2018.01)

(52) U.S. Cl.
CPC ............. *H04W 4/06* (2013.01); *H04W 76/19* (2018.02); *H04W 76/27* (2018.02); *H04W 76/30* (2018.02); *H04W 80/02* (2013.01)

(58) Field of Classification Search
CPC ....... H04W 4/06; H04W 80/02; H04W 76/19; H04W 76/30; H04W 76/27
See application file for complete search history.

(56) References Cited

U.S. PATENT DOCUMENTS

2017/0273057 A1*  9/2017  Lee .................. H04W 72/1289
2019/0007891 A1*  1/2019  Xu ......................... H04W 76/40

OTHER PUBLICATIONS

Qualcomm Incorporated, NarrowBand IOT (NB-IOT), 3GPP TSG RAN Meeting #69, RP-151621, Sep. 14-16, 2015, Phoenix, USA.
(Continued)

*Primary Examiner* — Will W Lin
(74) *Attorney, Agent, or Firm* — ScienBiziP, P.C.

(57) ABSTRACT

The present disclosure provides user equipment, a base station, and related methods. A method used in user equipment comprising: receiving a media access control (MAC) control element on a transport layer channel carrying a single cell multicast traffic channel (SC-MTCH), the MAC control element indicating a state of a multicast service on the SC-MTCH; and stopping a MAC layer timer according to the MAC control element.

4 Claims, 4 Drawing Sheets

(56) References Cited

OTHER PUBLICATIONS

Vodafone, Huawei, Hisilicon, Ericsson, Qualcomm, New work item proposal: Enhancements of NB-IoT, 3GPP TSG RAN Meeting #72, RP-161324, Jun. 13-16, 2016, Busan, Korea.
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 13)", 3GPP TS 36.300 V13.4.0 Jun. 2016.

* cited by examiner

USER EQUIPMENT, BASE STATION, AND RELATED METHODS

TECHNICAL FIELD

The present disclosure relates to the field of wireless communications technologies. More specifically, the present disclosure relates to user equipment, a base station, and related methods.

BACKGROUND

With the rapid growth of mobile communication and great progress of technology, the world will move toward a fully interconnected network society where anyone or anything can acquire information and share data anytime and anywhere. It is estimated that there will be 50 billion interconnected devices by 2020, of which only about 10 billion may be mobile phones and tablet computers. The rest are not machines communicating with human beings but machines communicating with one another. Therefore, how to design a system to better support the Internet of Everything is a subject needing further and intensive study.

In order to better implement Internet of Everything, a new work project (see non-patent literature: RP-151621 New Work Item: NarrowBand IOT (NB-IoT)), which may be referred to as narrowband Internet of Things (NB-IoT), was proposed in the Third Generation Partnership Project (3GPP) Long Term Evolution (LTE) standard at the 3GPP RAN #69 plenary session held in September 2015. In the description of the project, in order to meet the requirements for low power consumption, long standby time, lowered costs, and wide coverage of Internet of Things terminals, NB-IoT is set to operate in narrowband systems of uplink/downlink 180 KHz. The first-stage NB-IoT systems have completed the basic functional design, including system information broadcast notification, point-to-point unicast uplink data transmission, downlink data reception, and so on. In view of multicast demands for software download, terminal system upgrade, and packet information transfer in the future Internet of Things, a new work project aiming to enhance NB-IoT and implement multicast (see non-patent literature: RP-161324 New work item proposal: Enhancements of NB-IoT) was determined at the 3GPP RAN #72 plenary session held in June 2016, which explicitly pointed out that multicast transmission in an NB-IoT system is implemented based on the existing LTE Rel-13 SC-PTM characteristics.

In an existing LTE system, SC-PTM (single-cell point-to-multipoint) refers to multicast transmission of a multimedia broadcast service performed in a single cell. This characteristic introduces two logical channels: SC-MCCH and SC-MTCH, which are multiplexed on a DL-SCH transport layer channel. The SC-MCCH (Single Cell Multicast Control Channel) is a control channel and carries information including a multicast service type performed in a current cell and scheduling and reception configuration of a traffic channel SC-MTCH on which the service is provided. The SC-MTCH (Single Cell Multicast Traffic Channel) is a traffic channel and carries the specific service content.

A terminal interested in a multicast service first acquires scheduling and configuration of an SC-MCCH channel through the broadcast content on a system information block SIB20, and then acquires information carried on the control channel. If the service the terminal is interested in exists in a current cell, the terminal establishes, according to scheduling and reception configuration of an SC-MTCH corresponding to the service and carried on the SC-MCCH, a corresponding radio bearer S-MRB (Single Cell Multimedia Broadcast Multicast Service Point to Multipoint Radio Bearer), including configuring an RLC (Radio Link Control) layer, a MAC (Media Access Control) layer, and a physical layer; and the terminal starts receiving service information. At the same time, the terminal needs to periodically monitor whether information on the SC-MCCH channel changes. If a change occurs and the change is that the type of the service being currently listened to and the relevant information no longer appear in the information carried in the SC-MCCH channel, it indicates that the service being currently interested in has ended. The terminal releases the established S-MRB and stops receiving the service.

The SC-MTCH reception employs a DRX (Discontinuous Reception) manner. That is, the terminal starts an onDurationTimerSCPTM timer on a specific SFN (System Frame Number); and if no scheduling information about the SC-MTCH channel is received before the onDurationTimerSCPTM timer expires, the terminal no longer focuses on the channel until the next specific SFN arrives; if the terminal receives scheduling information of the SC-MTCH channel before the onDurationTimerSCPTM timer expires, a drx-InactivityTimerSCPTM timer is started; and then information of the channel is continuously monitored during running of the drx-InactivityTimerSCPTM timer. Once relevant scheduling is further received, the drx-InactivityTimerSCPTM timer is restarted. The process continues until the drx-InactivityTimerSCPTM timer expires. Once the drx-InactivityTimerSCPTM expires, the terminal no longer focuses on the channel unless the next specific SFN arrives.

Currently, terminating the SC-PTM service is reflected by the content transferred on the SC-MCCH channel (i.e., information related to the service is no longer issued). The SC-MCCH itself appears periodically. When being applied to an NB-IoT system, the period of the SC-MCCH is usually set to be longer to avoid power consumption of the terminal. As a result, the actual end time of the service is inconsistent with the time at which the terminal finds out that the service terminates, which leads to the terminal's continuously monitoring of the terminated service on the SC-MTCH channel unknowing the service is terminated, causing additional and unnecessary power consumption.

SUMMARY

According to a first aspect of the present disclosure, a method used in user equipment is provided, comprising: receiving a media access control (MAC) control element on a transport layer channel carrying a single cell multicast traffic channel (SC-MTCH), the MAC control element indicating a state of a multicast service on the SC-MTCH; and stopping a MAC layer timer according to the MAC control element.

In one embodiment, the method further comprises: notifying a control layer of the state of the multicast service that the control layer releases a single cell multimedia broadcast multicast service point to multipoint radio bearer (S-MRB).

In one embodiment, the MAC control element indicates termination of the multicast service on the SC-MTCH.

In one embodiment, the MAC control element indicates suspension of the multicast service on the SC-MTCH.

In one embodiment, the method further comprises: receiving information on a single cell multicast control channel (SC-MCCH); and re-establishing the S-MRB when receiving a resumption indication of the multicast service on the SC-MCCH.

In one embodiment, the MAC control element further indicates a resumption time of the multicast service.

In one embodiment, the method further comprises: re-establishing the S-MRB at the time of resuming the multicast service.

In one embodiment, the indication is carried in a logical channel identity (LCID) field contained in a MAC packet data unit (PDU) header.

According to a second aspect of the present invention, user equipment (UE) is provided, comprising: a receiving unit, configured to receive a media access control (MAC) control element on a transport layer channel carrying a Single Cell Multicast Traffic Channel (SC-MTCH), the MAC control element indicating a state of a multicast service on the SC-MTCH; and a control unit, configured to stop a MAC layer timer according to the MAC control element.

In one embodiment, the control unit is configured to: notify a control layer of the state of the multicast service so that the control layer releases a single cell multimedia broadcast multicast service point to multipoint radio bearer (S-MRB).

In one embodiment, the MAC control element indicates termination of the multicast service on the SC-MTCH.

In one embodiment, the MAC control element indicates suspension of the multicast service on the SC-MTCH.

In one embodiment, the control unit is further configured to: receive information on a single cell multicast control channel (SC-MCCH); and re-establish the S-MRB when receiving a resumption indication of the multicast service on the SC-MCCH.

In one embodiment, the MAC control element further indicates a resumption time of the multicast service.

In one embodiment, the control unit is further configured to: re-establish the S-MRB at the time of resuming the multicast service.

In one embodiment, the indication is carried in a logical channel identity (LCID) field contained in a MAC packet data unit (PDU) header.

According to a third aspect of the present invention, a method used in a base station is provided, comprising: generating a media access control (MAC) control element, the MAC control element indicating a state of a multicast service on a single cell multicast traffic channel (SC-MTCH); and sending the MAC control element on a transport layer channel carrying the SC-MTCH.

In one embodiment, the MAC control element indicates termination of the multicast service on the SC-MTCH.

In one embodiment, the MAC control element indicates suspension of the multicast service on the SC-MTCH.

In one embodiment, the method further includes: sending a resumption indication of the multicast service on a single cell multicast control channel (SC-MCCH).

In one embodiment, the MAC control element further indicates a resumption time of the multicast service.

In one embodiment, the indication is carried in a logical channel identity (LCID) field contained in a MAC packet data unit (PDU) header.

According to a fourth aspect of the present invention, a base station is provided, comprising: a generation unit, configured to generate a media access control (MAC) control element, the MAC control element indicating a state of a multicast service on a single cell multicast traffic channel (SC-MTCH); and a sending unit, configured to send the MAC control element on a transport layer channel carrying the SC-MTCH.

In one embodiment, the MAC control element indicates termination of the multicast service on the SC-MTCH.

In one embodiment, the MAC control element indicates suspension of the multicast service on the SC-MTCH.

In one embodiment, the sending unit is further configured to: send a resumption indication of the multicast service on a single cell multicast control channel (SC-MCCH).

In one embodiment, the MAC control element further indicates a resumption time of the multicast service.

In one embodiment, the indication is carried in a logical channel identity (LCID) field contained in a MAC packet data unit (PDU) header.

DESCRIPTION OF THE DRAWINGS

The above and other features of the present disclosure will become more apparent with the following detailed description in conjunction with the accompanying drawings.

DESCRIPTION OF THE EMBODIMENTS

The following describes the present invention in detail with reference to the accompanying drawings and specific embodiments. It should be noted that the present invention should not be limited to the specific embodiments described below. In addition, detailed descriptions of well-known technologies not directly related to the present invention are omitted for the sake of brevity, in order to avoid obscuring the understanding of the present invention.

In the following description, an LTE mobile communications system and its later evolved versions are used as exemplary application environments: a base station and a terminal device that support NB-IoT are used as examples to set forth multiple embodiments of the present invention in detail. However, it should be noted that the present invention is not limited to the following embodiments, but is applicable to more other wireless communications systems, such as a future 5G cellular communications system, and is applicable to other base stations and terminal devices, such as base stations and terminal devices supporting eMTC, MMTC, and so on.

Prior to the specific description, several terms mentioned in the present invention are illustrated as follows. The terms involved in the present invention shall have the meanings set forth below, unless otherwise indicated.

Figure 1:
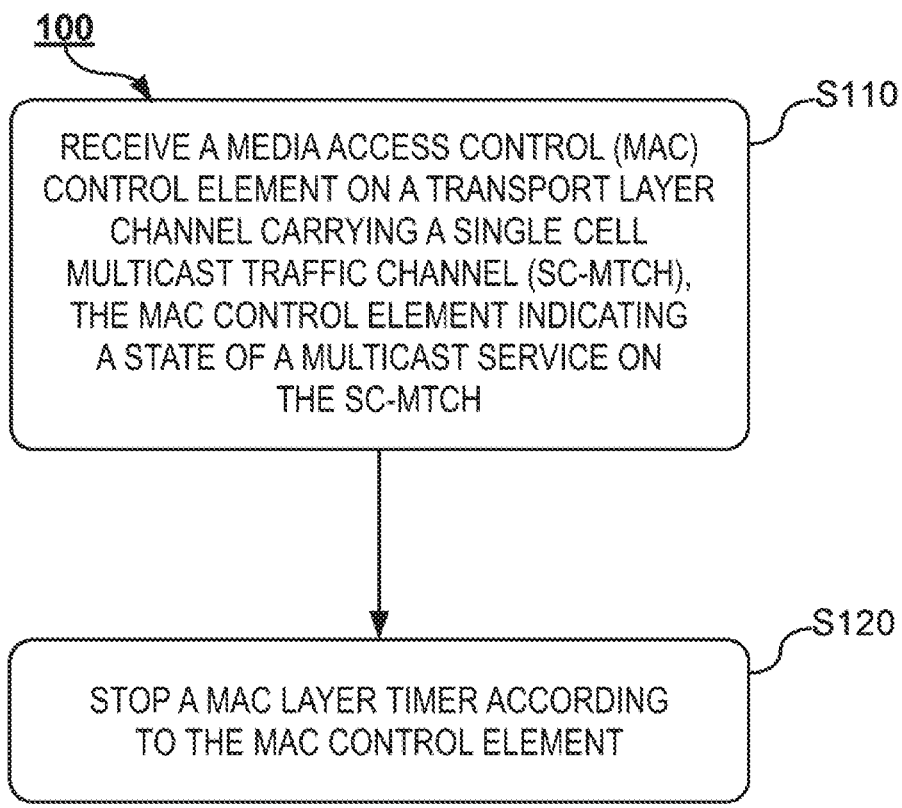
FIG. 1 is a flowchart of a method used in user equipment according to an embodiment of the present disclosure.

MAC PDU Media Access Control Packet Data Unit
SC-MTCH Single Cell Multicast Traffic Channel
MAC CE MAC Control Element
RRC Radio Resource Control
LCID Logical Channel Identity
S-MRB Single Cell Multimedia Broadcast Multicast Service Point to Multipoint Radio Bearer
MCE Multi-cell/multicast Coordination Entity
MME Mobility Management Entity FIG. 1 is a flowchart of a method 100 used in user equipment (UE) according to an embodiment of the present disclosure. As shown in the figure, the method 100 includes the following steps.

Step S110: receive a media access control (MAC) control element on a transport layer channel carrying a single cell multicast traffic channel (SC-MTCH), the MAC control element indicating a state of a multicast service provided on the SC-MTCH.

Step S120: stop a MAC layer timer according to the MAC control element.

The method 100 may further include: notifying a control layer of the state of the multicast service so that the control layer releases a single cell multimedia broadcast multicast service point to multipoint radio bearer (S-MRB).

In one example, the MAC control element indicates termination of the multicast service on the SC-MTCH.

Here, the indication is carried in a logical channel identity (LCID) field contained in a MAC packet data unit (PDU) header. For example, when the value of the LCID field is 10111, it indicates termination of the multicast service.

For example, after receiving the indication, if an onDurationTimerSCPTM timer is running, the UE stops the timer; if a drx-InactivityTimerSCPTM timer is running, the UE stops the timer; and a MAC layer of the UE indicates to an upper layer (for example, an RRC layer) that the current service has been terminated. After receiving the indication, the upper layer (for example, the RRC layer) releases the S-MRB radio bearer, including clearing various configurations of an RLC layer, the MAC layer, and a physical layer.

In another example, the MAC control element indicates suspension of the multicast service on the SC-MTCH.

Herein, the indication is carried in a logical channel identity (LCID) field contained in a MAC packet data unit (PDU) header. For example, when the value of the LCID field is 10111, it indicates suspension of the multicast service.

For example, after receiving the indication, if an onDurationTimerSCPTM timer is running, the UE stops the timer. If a drx-InactivityTimerSCPTM timer is running, the timer is stopped; and a MAC layer of the UE indicates to an upper layer (for example, an RRC layer) that the current service has been suspended. After receiving the indication, the upper layer (for example, the RRC layer) releases the S-MRB radio bearer, including clearing various configurations of an RLC layer, the MAC layer, and a physical layer.

In addition, the UE receives information on a single cell multicast control channel (SC-MCCH). The S-MRB is re-established when receiving a resumption indication of the multicast service on the SC-MCCH. For example, the UE periodically monitors whether content on the SC-MCCH channel changes. If a change occurs and the cause of the change is resumption of the suspended service, the UE re-establishes, according to the content on the SC-MCCH channel, the S-MRB radio bearer, including configuring parameters of the RLC layer, the MAC layer, and the physical layer; and the UE resumes receiving the service.

Alternatively, the MAC control element further indicates a resumption time of the multicast service. Herein, the resumption moment may be an absolute value, such as a time of day (for example, 22:10); or a relative value, such as several minutes/seconds relative to the current moment; or several system frame lengths. In this case, at the time of resuming the multicast service, the UE re-establishes the S-MRB, including configuring parameters of the RLC layer, the MAC layer, the physical layer, and so on.

Figure 2:
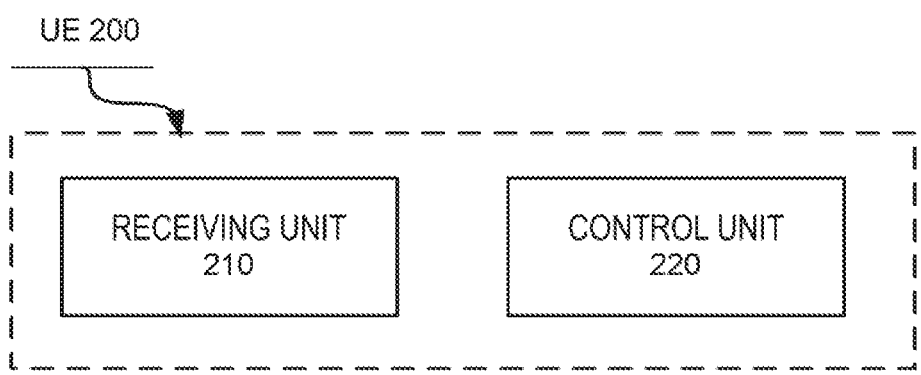
FIG. 2 is a block diagram of user equipment according to an embodiment of the present disclosure.

In accordance with the method 100 described above, the present disclosure provides user equipment (UE). FIG. 2 is a block diagram of a UE 200 according to an embodiment of the present disclosure. As shown in the figure, the UE 200 includes: a receiving unit 210, configured to receive a media access control (MAC) control element on a transport layer channel carrying a single-cell multicast traffic channel (SC-MTCH), the MAC control element indicating a state of a multicast service on the SC-MTCH: and a control unit 220, configured to stop a MAC layer timer according to the MAC control element.

In one embodiment, the control unit 220 is configured to: notify a control layer of the state of the multicast service so that the control layer releases a single cell multimedia broadcast multicast service point to multipoint radio bearer (S-MRB).

In one embodiment, the MAC control element indicates termination of the multicast service on the SC-MTCH.

In one embodiment, the MAC control element indicates suspension of the multicast service on the SC-MTCH.

In one embodiment, the control unit 220 is further configured to: receive information on a single cell multicast control channel (SC-MCCH); and re-establish the S-MRB, including configuring parameters of an RLC layer, a MAC layer, and a physical layer when receiving a resumption indication of the multicast service on the SC-MCCH.

In one embodiment, the MAC control element further indicates a resumption time of the multicast service.

In one embodiment, the control unit 220 is further configured to: re-establish the S-MRB at the time of resuming the multicast service.

In one embodiment, the indication is carried in a logical channel identity (LCID) field contained in a MAC packet data unit (PDU) header.

Figure 3:
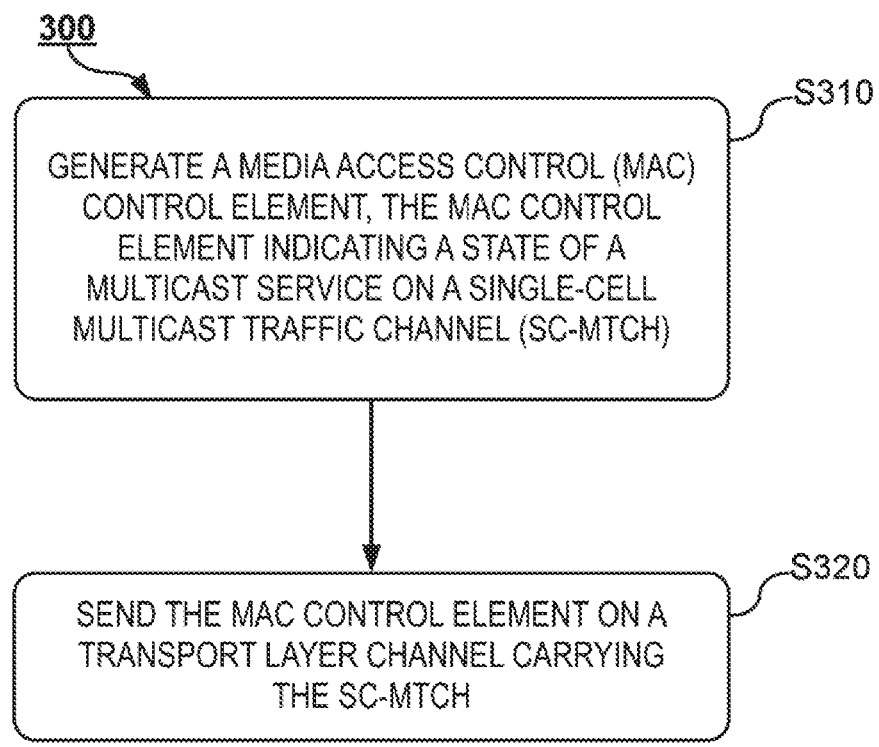
FIG. 3 is a flowchart of a method used in a base station according to an embodiment of the present disclosure.

In accordance with the method 100 described above, the present disclosure further provides a method used in a base station. FIG. 3 is a flowchart of a method 300 used in a base station according to an embodiment of the present disclosure. As shown in the figure, the method 300 includes the following steps.

Step S310: generate a media access control (MAC) control element, the MAC control element indicating a state of a multicast service on a single cell multicast traffic channel (SC-MTCH).

In one embodiment, indication information from other network elements (for example, an MCE or an MME) may be received, the indication information indicating a state of a specific multicast service or all multicast services; and a MAC control element is generated according to the indication information.

Step S320: send the MAC control element on a transport layer channel carrying the SC-MTCH.

In one embodiment, the MAC control element indicates termination of the multicast service on the SC-MTCH.

In one embodiment, the MAC control element indicates suspension of the multicast service on the SC-MTCH.

In one embodiment, the method 300 further includes: sending a resumption indication of the multicast service on a single cell multicast control channel (SC-MCCH).

In one embodiment, the MAC control element further indicates a resumption time of the multicast service.

In one embodiment, the indication is carried in a logical channel identity (LCID) field contained in a MAC packet data unit (PDU) header.

Figure 4:
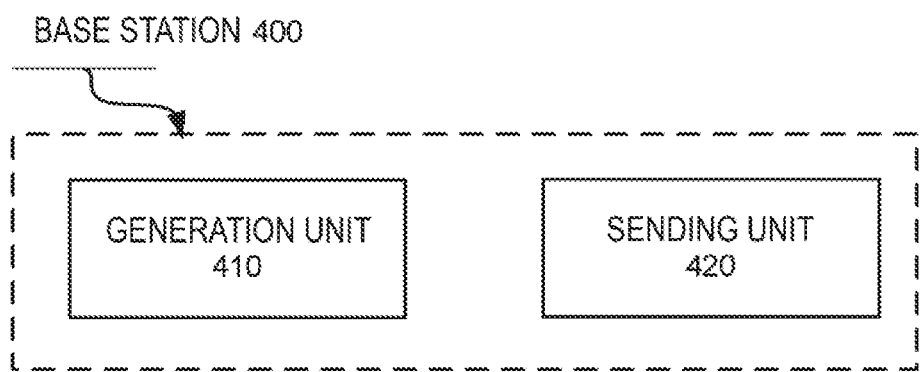
FIG. 4 is a block diagram of a base station according to an embodiment of the present disclosure.

In accordance with the method 300 described above, the present disclosure provides a base station. FIG. 4 is a block diagram of a base station 400 according to an embodiment of the present disclosure. As shown in the figure, the base station 400 includes: a generation unit 410 and a sending unit 420.

The generation unit 410 is configured to generate a media access control (MAC) control element, the MAC control element indicating a state of a multicast service on a Single Cell Multicast Traffic Channel (SC-MTCH).

In one embodiment, the generation unit 410 may receive indication information from other network elements (for example, an MCE or an MME), the indication information indicating a state of a specific multicast service or all multicast services, and generate a MAC control element according to the indication information.

The sending unit 420 is configured to send the MAC control element on a transport layer channel carrying the SC-MTCH.

In one embodiment, the MAC control element indicates termination of the multicast service on the SC-MTCH.

In one embodiment, the MAC control element indicates suspension of the multicast service on the SC-MTCH.

In one embodiment, the sending unit 420 is further configured to: send a resumption indication of the multicast service on a single cell multicast control channel (SC-MCCH).

In one embodiment, the MAC control element further indicates a resumption time of the multicast service.

In one embodiment, the indication is carried in a logical channel identity (LCID) field contained in a MAC packet data unit (PDU) header.

The examples described above with respect to the method 100 are also applicable to the UE 200, the method 300, and the base station 400.

The program running on the device according to the present invention may be a program that enables the computer to implement the functions of the embodiments of the present invention by controlling a central processing unit (CPU). The program or information processed by the program may be temporarily stored in a volatile memory (for example, a random access memory (RAM), a hard disk drive (HDD), a non-volatile memory (for example, a flash memory), or other memory systems.

The program for implementing the functions of the embodiments of the present invention may be recorded on a computer-readable recording medium. The corresponding functions can be achieved by the computer system through reading programs recorded on the recording medium and executing them. The so-called "computer system" herein may be a computer system embedded in the device, which may include operating systems or hardware (for example, peripherals). The "computer-readable recording medium" may be a semiconductor recording medium, an optical recording medium, a magnetic recording medium, a recording medium for programs that are dynamically stored for a short time, or any other computer-readable recording medium.

Various features or functional modules of the device used in the above embodiments may be implemented or executed through circuits (for example, monolithic or multi-chip integrated circuits). Circuits designed to execute the functions described in this description may include general-purpose processors, digital signal processors (DSPs), application specific integrated circuits (ASICs), field programmable gate arrays (FPGAs) or other programmable logic devices, discrete gates or transistor logic, or discrete hardware components, or any combination of the above. The general-purpose processor may be a microprocessor, or may be an existing processor, a controller, a microcontroller, or a state machine. The circuit may be a digital circuit or an analog circuit. When new integrated circuit technologies that replace existing integrated circuits emerge because of the advances in semiconductor technology, one or more embodiments of the present invention may also be implemented using these new integrated circuit technologies. Furthermore, the present invention is not limited to the embodiments described above. Although various examples of the embodiments have been described, the present invention is not limited thereto. Fixed or non-mobile electronic devices installed indoors or outdoors, such as AV equipment, kitchen equipment, cleaning equipment, air conditioners, office equipment, vending machines, and other household appliances, may be used as terminal devices or communications devices.

The embodiments of the present invention have been described in detail above with reference to the accompanying drawings. However, the specific structures are not limited to the above embodiments, the present invention also includes any design modifications that do not depart from the main idea of the present invention. In addition, various modifications can be made to the present invention within the scope of the claims. Embodiments resulted from the appropriate combinations of the technical means disclosed in different embodiments are also included within the technical scope of the present invention. In addition, components with the same effect described in the embodiments above may be replaced with one another.

The invention claimed is:

1. A User Equipment (UE) comprising:
receiving circuitry configured to receive a media access control (MAC) control element which indicates that a transmission of a Multimedia Broadcast Multicast Service performed on a single cell multicast traffic channel (SC-MTCH) is stopped; and
processing circuitry configured to release, in a case that the MAC control element is received, a Single Cell Multimedia Broadcast Multicast Service Point to Multipoint Radio Bearer, wherein
the processing circuitry is configured to perform, in a case that the MAC control element is received, MAC layer processing for indicating to a Radio Resource Control (RRC) layer that the transmission is stopped,
the processing circuitry is configured to release configurations of a Radio Link Control (RLC) layer, a MAC layer, and a physical layer, within a procedure for the release of the Single Cell Multimedia Broadcast Multicast Service Point to Multipoint Radio Bearer, and
the procedure is performed in the RRC layer.

2. A base station comprising:
generating circuitry configured to generate a media access control (MAC) control element which indicates that a transmission of a Multimedia Broadcast Multicast Service performed on a single cell multicast traffic channel (SC-MTCH) is stopped; and
transmitting circuitry configured to transmit the MAC control element to a User Equipment (UE) which (a) performs, based on a reception of the MAC control element, a MAC layer processing for indicating to an Radio Resource Control (RRC) layer that the transmission is stopped, and (b) releases a Single Cell Multimedia Broadcast Multicast Service Point to Multipoint Radio Bearer within a procedure within which configurations of a Radio Link Control (RLC) layer, a MAC layer, and a physical layer, are released, wherein
the procedure is performed in the RRC layer.

3. A method performed by a User Equipment (UE) comprising:
receiving a media access control (MAC) control element which indicates that a transmission of a Multimedia Broadcast Multicast Service performed on a single cell multicast traffic channel (SC-MTCH) is stopped;

performing, in a case that the MAC control element is received, MAC layer processing for indicating to a Radio Resource Control (RRC) layer that the transmission is stopped;

releasing a Single Cell Multimedia Broadcast Multicast Service Point to Multipoint Radio Bearer in a case that the MAC control element is received; and within a procedure for the releasing, releasing configurations of a Radio Link Control (RLC) layer, a MAC layer, and a physical layer, wherein the procedure is performed in the RRC layer.

4. A method performed by a base station comprising:

generating a media access control (MAC) control element which indicates that a transmission of a Multimedia Broadcast Multicast Service performed on a single cell multicast traffic channel (SC-MTCH) is stopped; and transmitting the MAC control element to a User Equipment (UE) which (a) performs, based on a reception of the MAC control element, a MAC layer processing for indicating to a Radio Resource Control (RRC) layer that the transmission is stopped, and (b) releases a Single Cell Multimedia Broadcast Multicast Service Point to Multipoint Radio Bearer within a procedure within which configurations of a Radio Link Control (RLC) layer, a MAC layer, and a physical layer, are released, wherein the procedure is performed in the RRC layer.

* * * * *